Aug. 28, 1962 H. G. DODGE 3,050,757
PIPE BURNISHING APPARATUS
Filed Feb. 16, 1960 4 Sheets-Sheet 1

INVENTOR.
HARRY G. DODGE
BY Bosworth, Sessions,
Herrstrom + Knowles
ATTORNEYS.

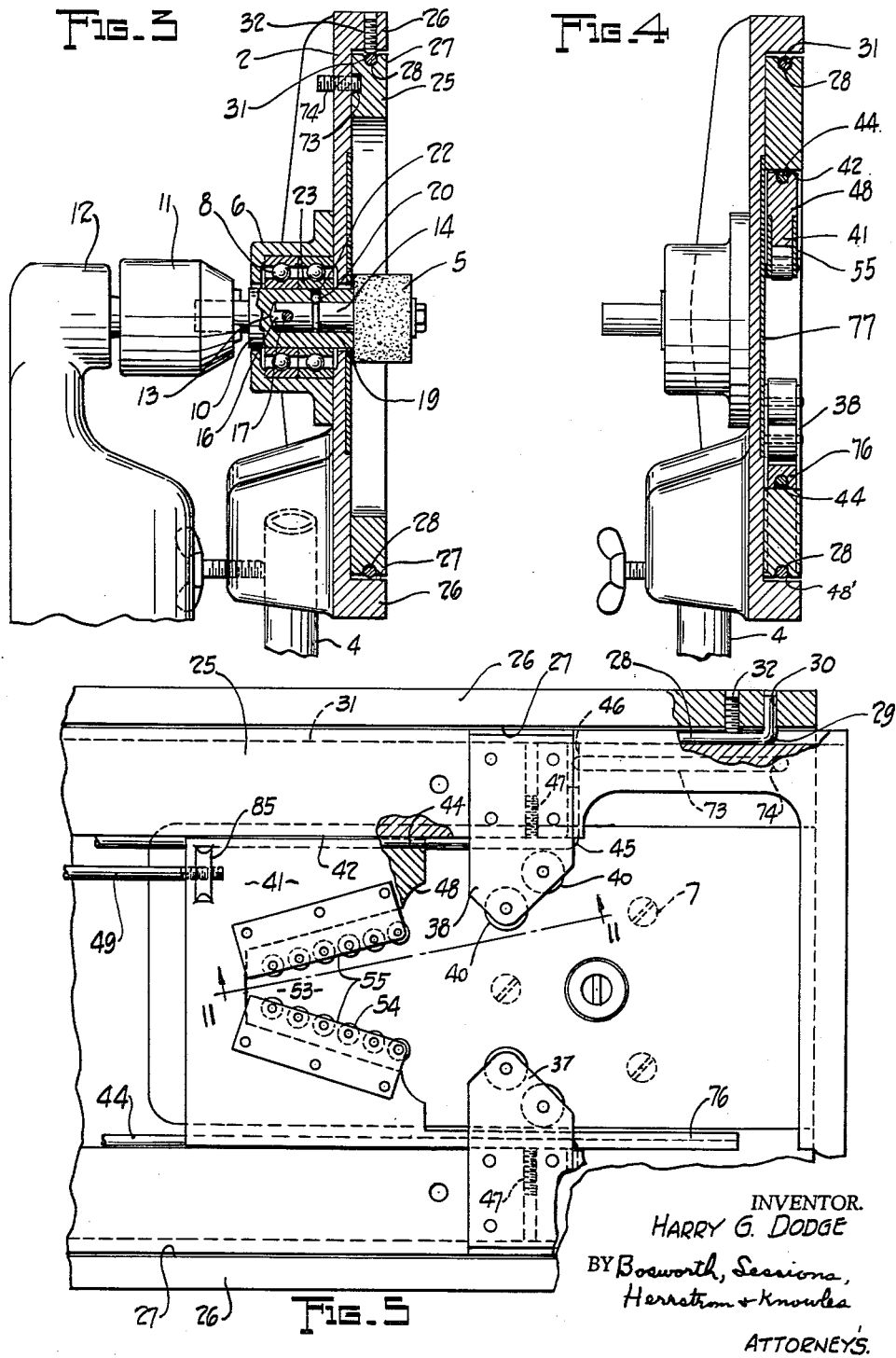

Aug. 28, 1962        H. G. DODGE        3,050,757
PIPE BURNISHING APPARATUS
Filed Feb. 16, 1960        4 Sheets-Sheet 3

INVENTOR.
HARRY G. DODGE
BY Bosworth, Sessions
Herrstrom & Knowles
ATTORNEYS

INVENTOR.
HARRY G. DODGE
BY Bosworth, Sessions,
Herrstrom + Knowles
ATTORNEYS

United States Patent Office 3,050,757
Patented Aug. 28, 1962

3,050,757
PIPE BURNISHING APPARATUS
Harry G. Dodge, Painesville, Ohio, assignor of four-tenths to John Stanik, Newbury, Ohio
Filed Feb. 16, 1960, Ser. No. 9,062
18 Claims. (Cl. 15—88)

This invention relates to cleaning and burnishing apparatus and more particularly to apparatus for cleaning and burnishing the interior and/or exterior surfaces of copper pipe, tube and fittings in preparation for assembling and soldering the same together into piping systems.

It has been common practice for years to use small diameter copper pipe or tube and fittings for piping systems for water supply lines and the like in homes, stores, and office buildings and factories.

Such copper piping systems are usually assembled with overlapping slip joints between adjacent members, such as a length of pipe and a fitting, which are completed to secure the adjacent members in place and make the joints leakproof by soldering. This is easily accomplished by assembling the joint, heating it, and placing solder adjacent the open end thereof, whereupon the solder is drawn into the joint by capillary action. The solder is then allowed to cool and harden and the joint is completed. The effectiveness of the joint depends upon the adherence of the solder to the respective adjacent overlapping surfaces of the members being joined, and this adhesion depends upon the cleanliness (freedom from grease, dirt, oxides and other foreign matter) of the respective surfaces themselves. In the past, the surfaces which were to be joined together have normally been cleaned and burnished, prior to assembly of the joint, by hand or with simple tools which did little to simplify or expedite the cleaning or burnishing operation.

Recently the use of relatively large diameter copper pipe and fittings in lieu of cast iron soil pipe for sewage pipe lines has become more common, as the price differential between has narrowed. The more common use of the relatively large diameter copper pipe, tube, and fittings in normal building construction has emphasized the inadequacy of present tools and methods for cleaning and burnishing copper surfaces for soldered joints. Further the adaption of copper soil pipe has not been as wide as possible, despite its other advantages, because of the unreasonable time and labor consumed and necessary for cleaning and burnishing the relatively large surface areas of such large size pipe, tube and fittings, in preparation for the usual soldered joints, by means of the common practices, methods and apparatus now in use.

It is, therefore, a general object of this invention to provide improved apparatus for more efficiently and effectively cleaning and burnishing the interior and/or exterior surfaces of pipe, tube, fittings and the like.

Other objects of this invention include the provision of improved apparatus, for cleaning and burnishing pipe, tube, fittings and the like, which is selectively adapted for use on exterior or interior surfaces; which is useful for cleaning surfaces of pipe, tube and fittings having a wide range of diameters; which is useful for cleaning interior and/or exterior surfaces of pipe, tube and fittings of any desired length, and may be adapted to provide additional support, adjacent the surface being cleaned, for articles of greater length; which is readily adapted for cleaning any desired length of exterior and/or interior surface over a relatively large range of lengths; which is easily and effectively used by inexperienced and/or unskilled personnel; which is convenient and economical to use; which is simple and rugged in construction and foolproof in operation; which is adapted for foot control whereby to leave the operator's hands free for handling the pipe, tube or fitting; which is adapted for use either with a motor of its own, or as an attachment for and in connection with a conventional portable motor; which is portable; which may be manufactured at reasonable cost and will save time and labor in properly, effectively, quickly and efficiently cleaning, burnishing and preparing surfaces for soldered pipe joints; which has a rotatable wire brush cleaning element; which lengthens brush life by providing for maximum utilization of bristle for wear; and which is adapted for use with and as a grinder for grinding rough spots on fittings and the like.

Still other objects of this invention include the provision of improved apparatus for cleaning and burnishing the external and internal surfaces of pipe, tube and fittings, which supports and guides, either the internal or external surfaces of pipe, tube and fittings, having a wide range of diameters, so as to insure functional contact of the surface to be cleaned with a rotatable wire brush and provide rapid, thorough and effective cleaning and burnishing thereof.

A still further object of this invention is to provide improved apparatus for cleaning and burnishing pipe, tube and fittings accomplishing one or more of the above objects and advantages.

These and other objects and advantages of this invention will appear from the following description of a preferred form thereof, reference being had to the accompanying drawings in which:

FIGURE 3 is a vertical section of the apparatus shown in FIGURE 1, viewed along the line 3—3 of FIGURE 1;

FIGURE 4 is a vertical section of the apparatus shown in FIGURE 1, viewed along the line 4—4 of FIGURE 1;

FIGURE 5 is a broken front elevation, on an enlarged scale, of the apparatus shown in FIGURE 1, with the wear plate removed;

Figure 1:
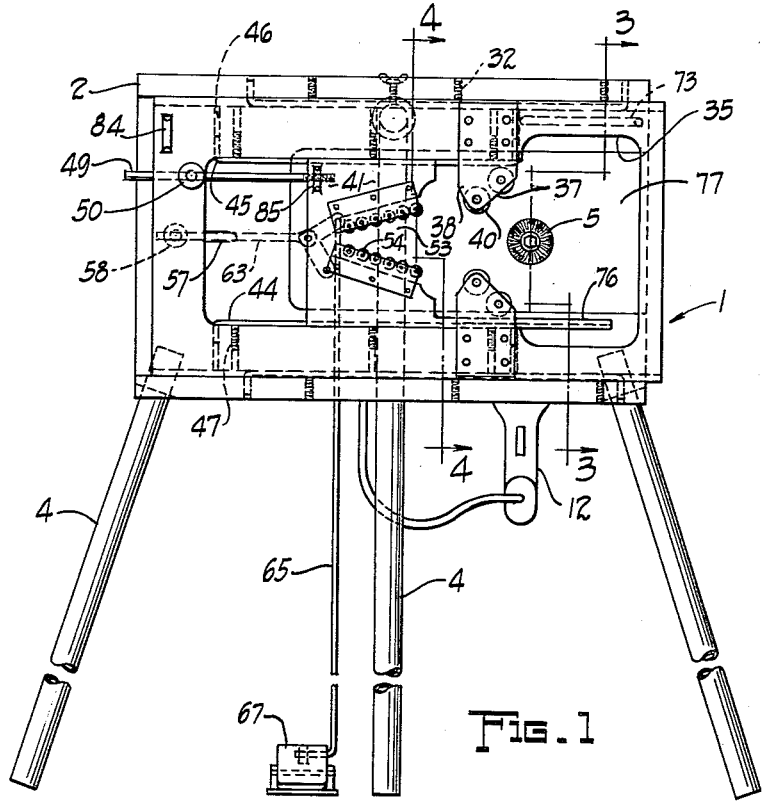
FIGURE 1 is a front elevation of a preferred form of apparatus embodying this invention.

Broadly, apparatus embodying this invention comprises a base plate adapted to be supported in a suitable manner, brush means supported on the base plate for rotation about its longitudinal axis and adapted to be driven by suitable, operator-controlled, means, slide means, mounted for reciprocal motion on said base in a plane perpendicular to the axis of rotation of said brush, supporting means rotatably supported on said slide means, and adapted to support either the internal or external surface of a wide range diameter of pipe, tube and fitting sizes in frictional engagement with said brush means when said slide means is actuated and displaced and means to actuate the apparatus to displace and position the slide means so that the desired internal or external surface of the pipe, tube or fitting to be cleaned and burnished is held in effective functional engagement with the brush means.

More particularly, apparatus embodying this invention is indicated generally at 1 and includes a base plate 2 which is preferably supported in a vertical position by suitable means, such as legs 4, albeit the base plate 2 may be supported in a horizontal position when desired and especially if no particularly long pipes or tubes are to be cleaned and burnished.

A wire brush or other cleaning means 5 is rotatably supported on base plate 2 and projects outwardly from the front face thereof. To this end a suitable housing 6, see FIGURE 3, is secured to plate 1 as by screws 7 (FIGURE 5) and a suitable bearing, such as ball bearings 8, supports a shaft 10 which extends rearwardly from the housing 6 and is preferably adapted to be received within the chuck 11 of a suitable power source, such as a separate conventional portable motor 12, albeit, it is not without the scope of this invention to provide driving means for shaft 10, such as a motor and belt drive, which is an integral part of the apparatus embodying the invention disclosed herein.

Also, it is preferred that brush 5 be readily attachable to and detachable from the apparatus 1 in order that the brushes may be readily changed, when worn, and brushes of varying diameter and/or length may be mounted on the apparatus for more efficiently cleaning and burnishing pipe, tube and fittings of different sizes. To this end the outer end of shaft 10 is preferably bored, as at 13, to receive and support a removable stub shaft 14 upon which the brush 5 is mounted. Stub shaft 14 is preferably notched as at 16 and engages over a fixed pin 17 provided in bore 13 in order to interlock shafts 10 and 14 and transmit motion therebetween more efficiently and without relative slippage.

Further, in order to releasably retain shaft 14 within shaft 10, shaft 14 is grooved as at 19 or otherwise indented, to provide a seat for ball 20, which is disposed within a suitable aperture 22 in the wall of shaft 10 and is resiliently biased radially inwardly by means of spring 23 so as to project slightly from the internal wall of shaft 10 and engage in seat 19.

Apparatus 1 is adapted to support a wide range of sizes of pipe, tube and fittings so that either the internal or external surfaces of the pipe, tube or fitting is held in efficient, functional contact with the brush 5 so that the same is easily, quickly, efficiently and effectively burnished and cleaned. To this end, apparatus 1 includes a main slide plate 25, which is mounted for reciprocal motion on base plate 2 and relative to brush 5. To this end base plate 2 is preferably provided with spaced parallel flanges 26 which extend forwardly from the base plate and have parallel mutually facing sides or edges 27 (see FIGURE 3). Wire track members 28 are supported upon the respective edges 27 of flanges 26, preferably by being bent as at 29 and seated and anchored in suitable sockets 30 formed in flanges 26, FIGURE 5. Main slide 25 engages over and slides upon tracks 28 by means of grooves 31 formed in its respective longitudinally extending edges and proper tension and friction is maintained between slide 25 and plate 2, both originally and subsequently, after wear, by means of one or more adjusting screws 32 extending through the respective flanges 26 and engaging the track member 28.

In order to support pipe, tube and fittings of various diameters, apparatus 1 is provided with a plurality of longitudinally spaced pairs of parallel anti-friction supporting means or rollers disposed at different distances from and at either side of the centerline of slide 25 which is perpendicular to the centerline of brush 5. Further, in order to limit the maximum necessary travel of slide 25 and provide for displacement of slide 25 in the same direction each time the apparatus is actuated to bring the surface to be cleaned into functional engagement with the brush 5, while providing support for a wide range of sizes of pipe tube and fittings and keeping the apparatus within reasonable size, it is preferred that main slide 25 be provided with both fixed anti-friction means and an inner slide, also having anti-frictional means, which is selectively displaceable with or within and independently of slide 25 to and for the purposes to be hereinafter more fully described.

Accordingly, main slide 25 is provided with a shaped hollow center 35 having a narrowed mid-section, as at 37, intermediate its length. When, as is preferred, slide 25 is of cast aluminum, mid-section 37 is conveniently formed of flat plates or sheets 38 of spring steel, as shown. Plates 38 support and form a sub-assembly with one or more pairs of rollers 40, see FIGURES 1, 4 and 5.

Rollers 40 are adapted to engage the outer surface of the article or work piece to be treated to reduce friction between the work piece and the slide 25 as the work piece is rotated relative to the slide 25 and brush 5, thereby facilitating rotation of the work piece, both by the operator himself and by the frictional engagement between the brush and the work piece, so as to insure that each part and portion of the surface to be cleaned is brought into functional engagement with the brush.

As will hereinafter more fully appear, rollers 40 are especially adapted to engage the outer surface of relatively large diameter pipe, tube and fittings so as to urge the interior surface of the same into engagement with the brush to the end that the main slide is always displaced in the same direction in order to urge the surface to be cleaned into functional engagement with the brush 5. Each pair of rollers 40 is a greater distance from the centerline through brush 5 than the next adjacent pair of rollers and the rollers diverge in the direction of travel of slide 25 when the apparatus is actuated to bring the surface to be cleaned into functional engagement with the brush.

The closest together of the pairs of rollers 40 is disposed at the narrowest portion of mid-section 37 and is spaced apart sufficiently to permit the mid-section 37 to pass by brush 5 when slide 25 is reciprocated within its limits of travel.

For the reasons hereinbefore stated, as well as to provide means for supporting and holding articles of relatively smaller diameter (i.e., those of less diameter than the distance between the closest together of the rollers 40) and for holding the external surfaces of relatively large diameter articles in functional engagement with brush 5, an inner slide 41 is supported for relative reciprocable motion within the main slide 25. Inner slide 41 is disposed on the trailing side (leftward as viewed in FIGURES 1 and 5) of mid-section 37, when the apparatus is actuated to bring the surface to be treated into engagement with the brush 5 and is mounted for selective reciprocation with, or within and independently of, main slide 25.

To this end the portion of center 35 to the leftward, as viewed, of mid-section 37 is formed with parallel, longitudinal extending edges or sides 42 upon which suitable track means for supporting inner slide 41 is provided. Conveniently such track means is similar to that between main slide 25 and base plate 2 and comprises wire members 44 which are bent as at 45 and have their ends anchored in suitable sockets 46 formed in main slide 25 (FIGURES 1 and 5). Track members 44 are also conveniently adjusted and tensioned by suitable means such as adjusting screws 47.

Inner slide 41 preferably comprises a transversely extending body member 48, having a groove 48' in both edges, see FIGURE 4, to engage over and slide upon track members 44. In order to provide for moving inner slide 41 relative to main slide 25 and for selectively locking the same in fixed relative positions for movement together, a rod 49 extends rearwardly from slide body 48 through a suitable aperture in main slide 25, and a thumb screw 50 (FIGURE 1) is provided on main slide 25 for tightening against rod 49 to lock inner slide 41 in place in main slide 25. Obviously thumb screw 50 may be loosened to release inner slide 41 so that the same may be selectively repositioned relative to the main slide and then locked in the desired new position by again tightening the thumb screw.

Figure 7:
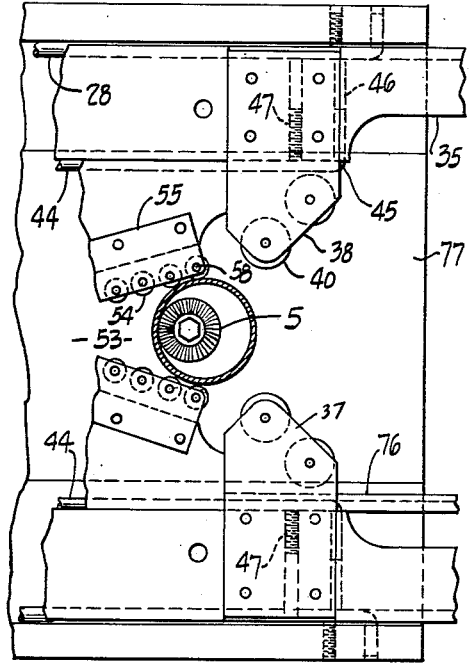
FIGURE 7 is a broken front elevation of the apparatus shown in FIGURE 1 in use for cleaning and burnishing the internal surface of a relatively small diameter pipe, tube, or fitting.

In order to support the relatively smaller articles, body member 48 is provided with a preferably V-shaped notch, as at 53, which opens toward the mid-section 37 of main slide 25 (rightwardly as shown in FIGURES 1 and 7) and is disposed with its apex substantially at the centerline of main slide 25 so as to be aligned with the center of brush 5. A plurality of laterally spaced parallel pairs of anti-friction means are provided along the edges of notch 53 to support the articles to be treated.

Such anti-friction means conveniently comprises rollers 54, which are rotatably supported on body member 48 and extend into notch 53 so as to engage the outer surface of the articles to be treated in the manner and for the purposes to be hereinafter more fully explained. Rollers 54 are disposed so that each pair of rollers 54 is a greater distance from the centerline of the slide 25 than next adjacent pair nearer the apex of notch 53. Conveniently the distance between the furthest apart of the pairs of rollers 54 is the same as or somewhat less than the distance between the closest together of the pairs of rollers 40.

Further, when as is preferred, body member 48 is cast of a suitable metal, such as aluminum, rollers 54 are preferably mounted upon and between and form a sub-assembly with spaced pairs of parallel plates or sheets 55, see FIGURE 4, which are in turn secured by suitable means to body member 48.

Also, body member 48 is preferably considerably thinner than main slide 25 so as to accommodate the relatively shorter collars of the smaller diameter fittings.

Apparatus 1 also preferably includes means for selectively reciprocating main slide 25 in order to position it relative to brush 5 and to bring the surface to be cleaned into and out of frictional engagement with brush 5. Further, it is preferred for convenience of manufacture and operation that motion in the same direction always accomplish the same objective of moving the surface to be cleaned into or out of engagement with the brush. Accordingly, apparatus 1 includes means urging main slide 25 in one direction relative to plate 2 and actuating means selectively operable by the user for moving the main slide in the opposite direction against the force of the first means.

To this end a slot 57 is formed in base plate 2 and a pin 58 is rotatably mounted on the rear of main slide 25 and extends through the slot 57 to the rear of the apparatus.

Figure 2:
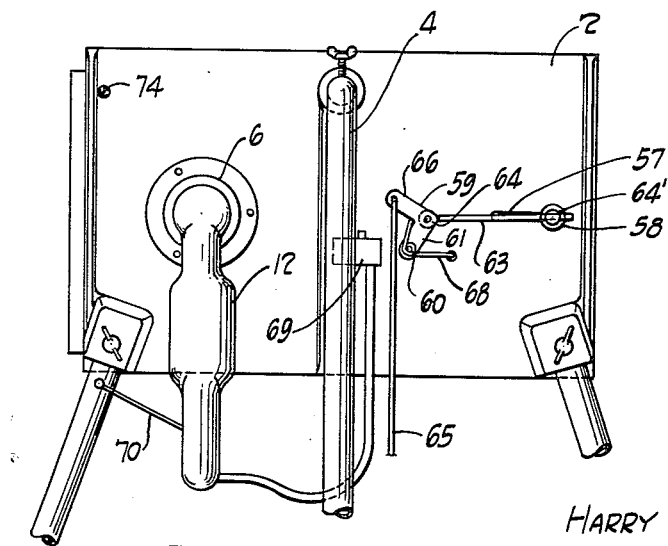
FIGURE 2 is a broken rear elevation of the apparatus shown in FIGURE 1.

A crank arm 59 is pivotally mounted, as at 60, at the end of one of its arms 61 on the rear of base plate 2, intermediate slot 57 and housing 6, see FIGURE 2. A rod 63 is pivotally mounted at the apex 64, of crank arm 59 and extends along the underside of slot 57 and is detachably secured to pin 58 as by extending through an aperture therein and being held in place by set screw 64. Thus the relative position of main slide 25 can be changed on rod 63 by merely loosening set screw 64', moving the slide to the desired position relative to the rod and retightening the set screw.

A wire rope or other cable means 65 is secured to the end of the other arm 66 of crank arm 59 and is adapted for actuation by a suitable foot pedal 67. A spring 68 acts between plate 2 and crank arm 59 to urge the crank arm in a clockwise direction and displace main slide 25 to the leftward as viewed in FIGURES 1 and 5, and the apparatus is actuated and slide 25 displaced rightwardly to move the surface to be cleaned into functional engagement with the brush by stepping on foot pedal 67 with sufficient force to rotate crank arm 59 in a counterclockwise direction to pull on rod 63.

A switch 69 for controlling the motor 12 is conveniently positioned in the line of travel of arm 66 of crank arm 59 so as to turn the drill on and off in sequential relationship with the movement of the work piece toward and away from the brush. Motor 12 may also be further supported in position by a suitable hook 70 carried by one of the legs 4.

In order to limit the travel of main slide 25 a longitudinally extending groove 73 with closed ends is formed in the back thereof, see FIGURE 3, and a stop or pin 74 extends therein from base plate 2. Pin 74 is preferably removable from the back of plate 2 so that the apparatus may be easily disassembled for cleaning.

Also, in order to keep grit and other foreign matter off the lower inner track member 44, it is preferred that lower side 42 of hollow 35 be spaced a slightly greater distance from the centerline of slide 25 and body member 48 of inner slide 41 includes a shield 76 which extends over lower track member 44 to cover the same, see FIGURE 4, and under the lower rollers 40 when inner slide 41 is displaced rightwardly as viewed in FIGURE 1 relative to the main slide.

Figure 6:
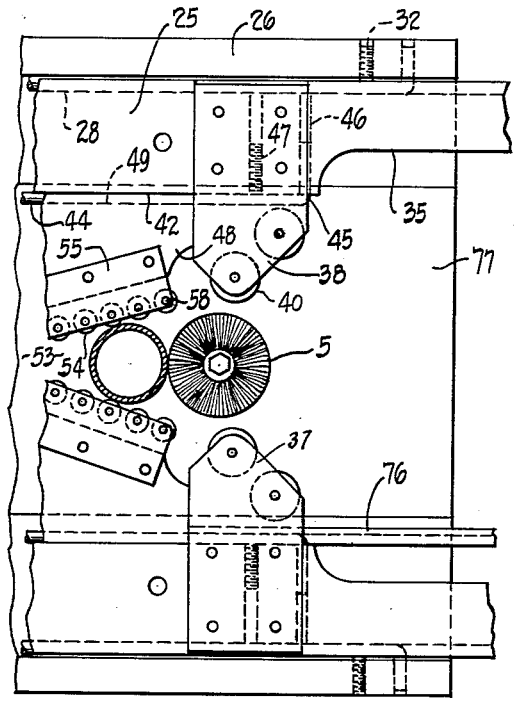
FIGURE 6 is a broken front elevation of the apparatus shown in FIGURE 1 in use for cleaning and burnishing the external surface of a relatively small diameter pipe, tube, or fitting.
Figure 8:
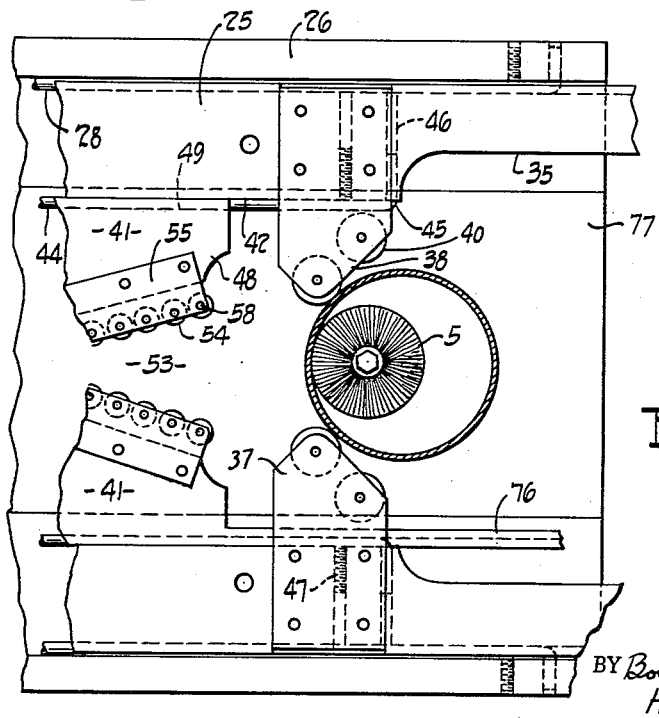
FIGURE 8 is a broken front elevation of the apparatus shown in FIGURE 1 in use for cleaning the internal surface of a relatively large diameter pipe, tube or fitting.
Figures 9, 10:
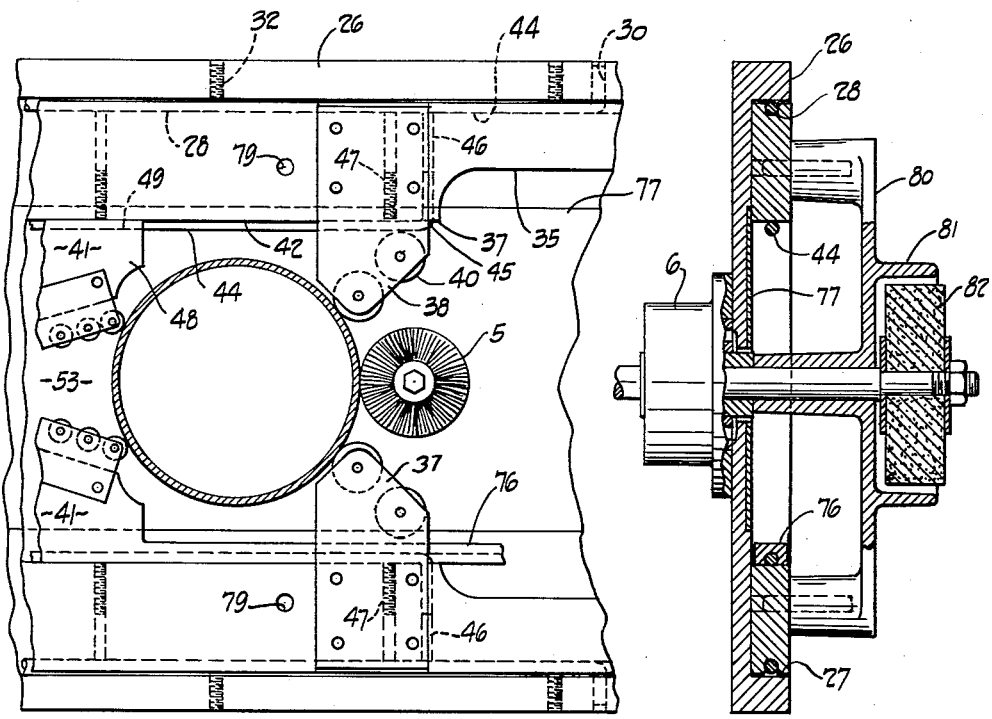
FIGURE 9 is a broken front elevation of the apparatus shown in FIGURE 1 in use for cleaning the external surface of a relatively large diameter pipe, tube or fitting.
FIGURE 10 is a vertical section similar to FIGURE 3 but with the grinding attachment in place.

To clean the external surface of relatively small or large diameter pipe, tube or fitting, the work piece is positioned between the rollers 54 and the brush 5 with the rollers urging the surface of the work piece into engagement with brush when the slide 25 is actuated in the manner aforesaid, see FIGURES 6 and 9. To clean the internal surface of a relatively small diameter work piece, the work piece is positioned over the brush and the apparatus positioned and actuated to cause the rollers 54 to urge the same into functional engagement with the brush 5, see FIGURE 7, and to clean the internal surface of a relatively large diameter work piece, the work piece is positioned over the brush and the slide positioned and actuated so that the rollers 40 urge the brush and surface being cleaned into functional engagement, see FIGURE 8. Obviously with different size articles different pairs of the rollers 40 or 54 engage the external surface thereof, but the coaction between the rollers and brush remains the same.

Also the work piece is rotated about its own axis and relative to the base plate 2 by hand and/or by the frictional engagement between the rotating brush and the surface being cleaned, in order to bring each part and portion of the surface into effective functional engagement with the brush so as to clean and burnish the entire surface. Accordingly, it is preferred that base plate 2, if of softer metal, include a wear plate 77 adjacent brush 5 to protect the base plate.

In use to clean the interior surface of a relatively large diameter pipe, tube or fitting, for example, apparatus embodying my invention is disposed in a suitable location, a motor or other power source is mounted on shaft 10 as shown, and main slide 25 is displaced by actuating foot pedal 67 to position the slide in approximately the desired position relative to brush 5, the work piece is disposed over the brush and the foot pedal is further actuated to tightly engage the work piece between the rollers and brush. The motor 12 is actuated to rotate the brush and as the brush rotates the work piece is rotated about its axis to bring the successive portions of the surface being cleaned into successive functional engagement with the brush.

When it is desired to treat a work piece of relatively small diameter or the exterior surface of a relatively large diameter work piece, inner slide 41 is properly positioned relative to slide 25, the work piece is positioned relative to brush 5 and foot pedal 67 is actuated to displace the main slide so that rollers 54 hold the work piece in functional engagement with the brush. Once the brush is actuated, the article is rotated as described above to insure that the entire surface is treated.

Naturally, brush 5 is changed and interchanged, as described above, to vary its diameter as the operator finds necessary and desirable in accordance with the diameter of the article being cleaned and burnished.

Figure 11:
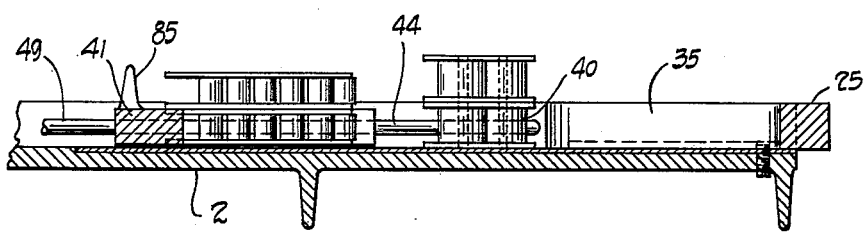
FIGURE 11 is a partly schematic, broken vertical section viewed along the line 11—11 of FIGURE 5 but with the wear plate in place and illustrating the stacking roller attachment for the apparatus shown in FIGURE 1 for better support of longer lengths of pipe and tube in the apparatus.

When treating pipes and tubes of relatively greater length, an auxiliary stand may be used to support the free end. Further, the plates 55 may be provided with sockets to receive pins, provided on otherwise similar sub-assemblies of plates 55 and rollers 54, and plates 38 may be provided with sockets to receive pins, provided on otherwise similar sub-assemblies of plates 38 and rollers 40, in order to extend the rollers to provide more support for the end, of long work pieces, which is in engagement with the apparatus 1, see FIGURE 11.

Also, slide 25 may be provided with sockets 79, FIGURE 9, to receive complementary pins and provide three point support for a grinding attachment indicated generally at 80, FIGURE 10.

Grinder attachment 80 is adapted to fit in shaft 10 in lieu of brush 5 and to be driven in the same way as brush 5. Attachment 80 includes housing 81 and grinding wheel 82 for grinding rough spots on fittings, tubing, brushes or other convenient purposes, and sockets 79 are preferably so disposed that slide 25 must be displaced rightwardly, as viewed in FIGURE 1, a predetermined distance in order to insert and position grinder 80 so that spring 68 places the assembly under tension when grinder 80 is in use to maintain the same in place. Bosses 84 and 85 may be provided on slides 25 and 41 respectively, to facilitate manual displacement thereof.

Apparatus 1 lengthens brush life by permitting a wide range of adjustment of the relative positions between the rollers and the brush 5 whereby the bristles of the brush may be worn substantially to the hub and yet the apparatus insures proper and full functional engagement between the brush bristles and the surface being cleaned.

Modifications, changes and improvements to the invention herein described and disclosed may occur to those skilled in the art who come to understand the precepts and principles thereof. Therefore, it is not desired to limit the scope of the patent issued hereon by the preferred form of the invention herein particularly illustrated and described nor in any manner inconsistent with the advance by which the invention has promoted the art.

I claim:

1. Apparatus for cleaning and burnishing pipe, tube, fittings and the like comprising a vertically disposed base plate having spaced parallel flanges with mutually facing edges, track members extending parallel with and supported on the mutually facing edges of said flanges respectively, means extending through said flanges for adjusting the tension on said track members, a main slide disposed in face to face sliding engagement with said base plate and having edges with grooves for engaging over said track members respectively, said main slide being reciprocable relative to said base plate, a housing supported on the rear of said plate, bearing means within said housing, a drive shaft rotatably supported within said bearing means, and extending rearwardly from said housing, means for rotating said drive shaft; a bore in the opposite end of said drive shaft, a wire brush having a stub shaft detachably disposed in said bore of said drive shaft, means interlocking said stub shaft and said drive shaft, said main slide having an open center portion defined in part by parallel edges, an inner slide reciprocably mounted on said main slide and within said open center portion of said main slide, inner, upper and lower track members supported on said parallel edges respectively, means for adjusting the tension on said inner track members, a rod extending outwardly from said inner slide through said main slide, a thumb screw carried in said main slide and releasably engaging said rod, said inner slide having a thickness less than said main slide, said inner slide having a V-shaped notch opening toward said brush, a plurality of parallel, opposed pairs of rollers carried by said inner slide along the edges of said notch, each said pair of rollers being respectively a greater distance from the centerline of said notch than the next adjacent pair of rollers nearer the apex of said notch, roller support means carried by said main slide intermediate the ends of said hollow interior and extending inwardly from either side toward the center thereof, a plurality of parallel, opposed pairs of rollers supported on said roller support means on either side of the centerline of said main slide, each said pair of main slide rollers being a greater distance from the centerline of said slide than the next adjacent pair of said rollers nearer said inner slide, a closed end groove in the side of said main slide adjacent said base plate; a removable pin extending through said base member and into said groove, a shield extending from the lower edge of said inner slide and parallel with the centerline of said apparatus and covering said lower inner track member, a slot in said base plate extending intermediate and parallel with said base plate flanges, an L-shaped crank arm pivotally mounted at the end of one of its arms on the rear of said base plate, a control rod pivotally mounted on the apex of said crank arm, a pin rotatably carried on said main slide and extending through said slot, said control rod extending through said rotatable pin, a thumb screw releasably securing said control rod to said rotatable pin, spring means acting between said crank arm and said base plate to rotate said crank arm to displace said main slide relative to said brush in the direction away from that toward which said notch opens, cable means extending from the other arm of said crank arm, and foot operated means for actuating said cable means to rotate said crank arm against the force of said spring means to displace said main slide in the opposite direction.

2. The apparatus according to claim 1, with a grinder having a shaft engaging in said bore of said drive shaft and means interengaging with said main slide.

3. The apparatus according to claim 1 in which a plurality of said rollers are supported in sub-assemblies comprising spaced parallel plate members and said rollers, and said sub-assemblies are carried by said inner slide and said main slide, respectively.

4. Apparatus for cleaning and burnishing pipe, tube, fittings and the like comprising a base plate, a main slide disposed in face to face sliding engagement with said base plate and being reciprocable relative to said base plate, a drive shaft rotatably supported on said base plate, a wire brush detachably mounted on said drive shaft and adapted to be rotated thereby, said main slide having an open center portion, an inner slide reciprocably mounted on said main slide within said open center portion thereof, a rod extending outwardly from said inner slide through said main slide, means releasably locking said inner slide rod to said main slide, said inner slide having a V-shaped notch opening toward said brush, a plurality of parallel, opposed pairs of rollers carried by said inner slide along the edges of said notch, each said pair of rollers being respectively a greater distance from the centerline of said notch than the next adjacent pair of rollers nearer the apex of said notch, roller support means carried by said main slide intermediate the ends of said open center portion and extending inwardly from either side toward the center thereof, a plurality of parallel, opposed pairs of parallel rollers supported on said roller support means on either side of the centerline of said main slide, each said pair of main slide rollers being a greater distance from the centerline of said slide than the next adjacent pair of said rollers nearer said inner slide, means limiting the travel of said main slide on said base plate, a slot in said base plate, a crank arm having one end pivotally mounted to the rear of said base plate, connector means pivotally secured to said crank arm intermediate the ends thereof and extending therefrom, means carried by said main slide and extending through said slot and releasably engaging said connector means, spring means acting between said crank arm and said base plate to urge said crank arm to dispalce said main slide relative to said brush in the direction away from that toward which said notch opens, cable means extending from the other arm of said crank arm, and foot operated means for actuating said cable means to rotate said crank arm against the force of said spring means to displace said main slide.

5. Apparatus for cleaning and burnishing pipe, tube, fittings and the like comprising a base plate having spaced parallel flanges with mutual facing sides, track members carried by said base plate extending parallel with said sides, respectively, means extending through said flanges for adjusting the tension on said track members, a main slide disposed in face to face sliding engagement with said base plate and having lateral edges with grooves for engaging over said track members, respectively, said main slide being reciprocable relative to said base plate, a wire brush detachably mounted on said base plate, means for selectively rotating said brush, said main slide having an open center portion defined in part by parallel edges, an inner slide reciprocably mounted on said main slide and within said open center portion of said main slide, inner track member carried by said main slide and extending parallel with said parallel edges, respectively, said inner slide being supported on said inner track members, means for adjusting the tension on said inner track members, said inner slide having a V-shaped notch opening toward said brush and having an apex and a centerline perpendicular to the center of said brush, a plurality of parallel, opposed pairs of rollers carried by said inner slide along the edges of said notch, each said pair of rollers being respectively a greater distance from the centerline of said notch than the next adjacent pair of rollers rearer the apex of said notch, roller support means carried by said main slide intermediate the ends of said open center portion and extending inwardly from either side thereof, a plurality of parallel, opposed pairs of rollers supported on said roller support means on either side of the centerline of said main slide passing through the center of said brush, each said pair of main slide rollers being a greater distance from said centerline of said slide than the next adjacent pair of said rollers nearer said inner slide, means preventing said main slide from sliding off said base plate, a shield carried by said inner slide and overlying a said inner track member, a slot in said base plate extending intermediate and parallel with said base plate flanges, a crank arm pivotally mounted on the side of said base plate remote from said main slide, means interconnecting said crank arm and said main slide through said slot, means for selectively positioning said inner slide in a predetermined position on said main slide, spring means urging said crank arm to rotate in a predetermined direction to displace said main slide relative to said brush in the direction away from that toward which said notch opens, and means for actuating said crank arm to rotate said crank arm against the opposition of said spring means to displace said main slide in the opposite direction.

6. Apparatus for cleaning and burnishing pipe, tube, fittings and the like comprising a base plate, track means carried by said base plate, a main slide mounted for reciprocation on said track means and having face to face sliding engagement with said base plate, a wire brush detachably mounted on said base plate for rotation about an axis normal to said base plate, said main slide having an open center portion defined in part by parallel edges and a narrowed mid-section, a second slide mounted on said main slide and adapted for independent reciprocation in said open center portion and to one side of said mid-section, means for locking said second slide in a selective predetermined position relative to said main slide, said second slide having a V-shaped notch opening toward said brush, each said pair of second slide rollers being spaced, respectively, a greater distance from the centerline of said notch than the next adjacent pair of said second slide rollers nearer the apex of said notch, a plurality of parallel, opposed pairs of rollers supported on said mid-section of said main slide, one roller of each said pair of main slide rollers being disposed on each side of the centerline of said notch and each said pair of main slide rollers being a greater distance from the centerline of said notch than the next adjacent pair of said main slide rollers nearer said second slide, means limiting the travel of said main slide on said base plate, spring means displacing said main slide relative to said brush in the direction of said second slide, and means for actuating said main slide to displace it in the opposite direction against the force of said spring means.

7. The apparatus according to claim 6 in which said second slide is of less thickness than said main slide.

8. The apparatus according to claim 6 in which at least one of said rollers has an axis normal to said base plate and said apparatus also comprises an extension roller of the same diameter as said one roller, said extension roller being mounted on said apparatus with its axis in alignment with said axis of said one roller.

9. The apparatus according to claim 6 in which certain of said rollers have their respective axis normal to said plate, and said apparatus includes an extension roller subassembly, each said subassembly comprising a pair of spaced parallel plates with a plurality of rollers mounted therebetween, said extension roller subassembly being mounted on said apparatus with each roller in said subassembly having its axis in alignment with the axis of one said certain roller and having a diameter equal to the diameter of the roller with which its axis is aligned.

10. Apparatus for cleaning and burnishing pipe, tube, fittings and the like comprising a base plate having track means, main slide means mounted on said track means for reciprocation relative to and in face to face sliding engagement with said base plate, abrading means detachably mounted on said base plate for selective rotation about an axis normal to said base plate, said main slide having an open center portion, said abrading means extending into said open center portion of said main slide, a second slide mounted on said main slide for reciprocation, relative thereto, within said open center portion, means for positioning said second slide relative to said main slide, a plurality of parallel, opposed pairs of rollers carried by said second slide, one roller of each said pair being disposed on each side of a line perpendicular to said axis and parallel with the direction of reciprocation of said slides, each said pair of rollers being respectively a greater distance from said line than the next adjacent pair of rollers more remote from said abrading means, at least one pair of main slide rollers rotatably supported on said main slide with one roller to each side of said line and being spaced a greater distance apart than the nearer together of said pairs of second slide rollers, spring means biasing said main slide for displacement relative to said abrading means in the direction in which said second slide rollers converge, and means for actuating said main slide to displace it in the opposite direction against the force of said spring means.

11. Apparatus for cleaning and burnishing pipe, tube, fittings and the like comprising a base, main slide means mounted on said base for selective reciprocation relative thereto in a predetermined plane, brush means detachably mounted on said base for selective rotation about an axis normal to said plane in which said main slide reciprocates, a second slide mounted on said main slide for reciprocation relative thereto and in the same direction as said main slide reciprocates, means for selectively positioning said second slide relative to said main slide, a plurality of parallel, opposed pairs of anti-friction support means mounted on said second slide, one said support means of each said pair of support means being disposed on each side of a line perpendicular to said axis and parallel with the direction of reciprocation of said slides, each said pair of support means being respectively a greater distance from said line than the next adjacent pair of support means more remote from said brush means, at least one pair of parallel opposed main slide anti-friction support means mounted on said main slide, spring means biasing said main slide away from said abrading means in the direction of said second slide, and means for actuating said main slide to displace it in the opposite direction against the force of said spring means.

12. Apparatus for cleaning and burnishing a surface of a work piece such as pipe, tube, fittings or the like comprising a base plate, cleaning means rotatably supported on said base plate for rotation about an axis normal thereto, slide means mounted on said base for reciprocation relative thereto and having face to face sliding engagement therewith, a plurality of pairs of parallel, opposed anti-friction support means carried on said slide means and adapted to engage the work piece to be treated in said apparatus, one support means of each said pair being disposed on each side of a line extending through said axis, each said pair of support means being spaced a greater distance from said line than an adjacent pair of support means, and means for selectively displacing said slide means in a predetermined direction relative to said cleaning means to engage said work piece and displace said surface thereof into functional engagement with said cleaning means.

13. The apparatus according to claim 12 in which said slide means comprises a main slide member having face to face sliding engagement with said base plate, and a second slide member mounted on said main slide member for reciprocation relative thereto, and in the same direction as said main slide member.

14. The apparatus according to claim 13 with at least one pair of parallel, opposed anti-friction support means being disposed on each said slide member.

15. The apparatus according to claim 13 in which said first slide member has an open center portion, said cleaning means extends within said open center portion and said second slide member reciprocates within said open center portion.

16. The apparatus according to claim 12 with means biasing said slide means in the direction opposite to said predetermined direction.

17. Apparatus for cleaning and burnishing a surface of a work piece such as pipe, tube, fittings or the like comprising a base, cleaning means rotatably supported on said base for rotation about an axis, slide means mounted on said base for reciprocation relative thereto in a plane perpendicular to said axis, a plurality of pairs of parallel, opposed support means carried on said slide means and adapted to engage the work piece to be treated in said apparatus, one support means of each said pair being disposed on each side of a line extending through said axis and each said pair of support means being spaced a greater distance from said line than an adjacent pair of support means, and means for selectively displacing said slide means in a predetermined direction relative to said cleaning means to engage said work piece and displace said surface into functional engagement with said cleaning means.

18. The apparatus according to claim 17 in which said slide means comprises a first slide member in face to face sliding engagement with said base and a second slide member mounted on said first slide member for reciprocal movement relative thereto and in the same direction thereas.

References Cited in the file of this patent

UNITED STATES PATENTS

| | | |
|---|---|---|
| 2,631,315 | Hauser | Mar. 17, 1953 |
| 2,646,652 | Blood | July 28, 1953 |
| 2,823,408 | Meadors | Feb. 18, 1958 |